United States Patent [19]

Tadokoro et al.

[11] 3,973,920

[45] Aug. 10, 1976

[54] MAGNETIC RECORDING MEDIUM

[75] Inventors: Eiichi Tadokoro; Tatsuji Kitamoto, both of Odawara, Japan

[73] Assignee: Fuji Photo Film Co., Ltd., Japan

[22] Filed: Aug. 11, 1975

[21] Appl. No.: 603,625

[30] Foreign Application Priority Data

Aug. 22, 1974  Japan.............................. 49-95576

[52] U.S. Cl.................................. 29/194; 29/195; 29/199
[51] Int. Cl.² ...................................... B32B 15/00
[58] Field of Search.......... 29/195 M, 195 P, 195 G, 29/194, 199

[56] References Cited
UNITED STATES PATENTS

| | | | |
|---|---|---|---|
| 3,460,968 | 8/1969 | Bate et al............................ | 117/62 |
| 3,466,156 | 9/1969 | Peters et al......................... | 29/195 |
| 3,471,272 | 10/1969 | Wilhelm et al..................... | 29/194 |
| 3,607,149 | 9/1971 | Rice et al............................ | 29/199 |
| 3,682,604 | 8/1972 | Girard et al. ...................... | 29/194 |
| 3,717,504 | 2/1973 | Aonuma .............................. | 29/195 |

Primary Examiner—L. Dewayne Rutledge
Assistant Examiner—E. L. Weise
Attorney, Agent, or Firm—Wenderoth, Lind & Ponack

[57] ABSTRACT

This invention relates to a magnetic recording medium, which comprises a first protective plating layer consisting of at least one selected from the group consisting of rhenium, osmium, ruthenium, chromium, rhodium and mixtures thereof, provided on a ferromagnetic thin layer plated on a non-magnetic base material by a plating method, and a second protective plating layer consisting of at least one selected from the group consisting of silver, gold, copper, platinum, palladium, nickel-phosphorus alloys and mixtures thereof, further provided on the first protective plating layer.

8 Claims, 2 Drawing Figures

MAGNETIC RECORDING MEDIUM

BACKGROUND OF THE INVENTION

This invention relates to the protection of recording of a magnetic recording medium and more particularly, it is concerned with the provision of a magnetic drum, magnetic disk or like with a protective layer by an electroplating or electroless plating method.

In a magnetic recording apparatus of the prior art using a ring type head for recording or reproducing, it is important in order to increase the recording density to bring the magnetic head into contact with a magnetic layer as smoothly and tightly as possible, but the recording or reproducing is continued at a rate of 5 to 40 m/sec with holding the contact of the magnetic head and magnetic layer, resulting in that both the magnetic head and magnetic layer are worn and the recording or reproducing becomes impossible often. Therefore, there have hitherto been proposed various methods, for example, wherein a magnetic layer itself is hardened or a magnetic recording layer is protected with a hard non-magnetic film of rhodium or chromium having a thickness of 0.05 to 3 microns by plating or by vapor deposition. As a further improved method, it is proposed to coat such a hard film surface with a lubricating material such as silicone resin, grease, stearic acid or oleic acid in a thickness of about 0.05 to 1 micron.

However, these known methods have the following disadvantages:

1. A protective layer obtained by the hard plating method is so hard and brittle that it tends to be broken by a rapid force and a magnetic layer or head tends to be scratched by its fragments.
2. The method of hardening a magnetic layer itself has the disadvantage, in addition to the above described disadvantage (1), that a stable processing is difficult since the thickness thereof is below 1 micron.
3. The coating of a lubricant such as silicone resin tends to be stripped by a high speed friction and, accordingly, the effect thereof cannot be expected for a long period of time.

The inventors have made efforts to solve these problems and to lengthen the life of a magnetic recording medium and head.

SUMMARY OF THE INVENTION

It is an object of the invention to provide a protected magnetic recording medium, whereby the above described disadvantages can be overcome.

It is another object of the invention to provide an improved magnetic recording medium, whereby wearing of a magnetic head or magnetic layer can effectively be prevented.

It is a further object of the invention to provide an improved magnetic recording medium having two protective plating layers.

These objects can be attained by a magnetic recording medium, in which a first protective plating layer consisting of at least one selected from the group consisting of rhenium, osmium, ruthenium, chromium, rhodium and mixtures thereof is provided on a ferromagnetic thin layer plated on a non-magnetic base material by a plating method, and a second protective plating layer consisting of at least one selected from the group consisting of silver, gold, copper, platinum, palladium, nickel-phosphorous and mixtures thereof is further provided on the first protective plating layer.

BRIEF DESCRIPTION OF THE DRAWING

The accompanying drawings are to illustrate the principle and merits of the invention in greater detail.

DETAILED DESCRIPTION OF THE INVENTION

In the magnetic recording medium according to the present invention, a first protective plating layer of at least one selected from the group consisting of rhenium, osmium, ruthenium, chromium, rhodium and mixtures thereof, preferably, with a thickness of 0.01 to 2 microns is provided on a ferromagnetic thin layer plated by a plating method on a non-magnetic base material, and a second protective plating layer of at least one selected from the group consisting of silver, gold, copper, platinum, palladium, nickel-phosphorus alloys and mixtures thereof, preferably, with a thickness of 0.01 to 2 microns is further provided on the resulting first protective plating layer. The metals of the first group are hard and those of the second group are lubricant.

Since the wearing of a magnetic head and the breakage of a magnetic layer produced by contact of the magnetic head and magnetic layer are common problems to magnetic tapes, magnetic drums and magnetic disks, the protective plating layer of the present invention can equally be applied to these magnetic recording media.

Figure 1:
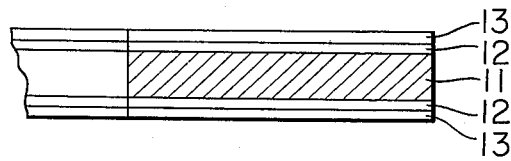
FIG. 1 shows a sectional view of magnetic disk of the prior art.
Figure 2:
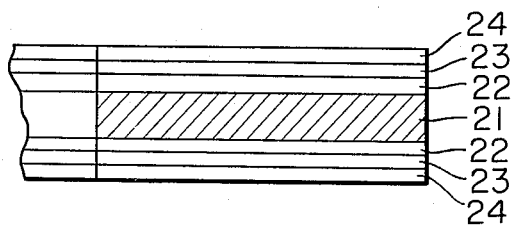
FIG. 2 shows a sectional view of magnetic disk provided with a protective film according to the invention.

The present invention will now be illustrated in detail as to a magnetic disk, for example. FIG. 1 shows a sectional view of magnetic disk of the prior art, in which 11 is a disk base plate, 12 and 12 are magnetic layers and 13 and 13 are protective layers. FIG. 2 shows a sectional view of magnetic disk according to the present invention, in which 21 is a disk base plate, 22 and 22 are magnetic layers, 23 and 23 are hard protective plating layers and 24 and 24 are lubricant protective plating layers. A magnetic disk is generally of a shape having an outer diameter of 300–150 mm, inner diameter of 100–20 mm and thickness of 2–10 mm. Base 11 is made of an aluminum alloy, magnesium alloy, glass, ceramic or plastic. The surface of base 11 is activated with a 1 to 5 % solution of stannous chloride, substituted by a 1 to 5% solution of palladium chloride and then subjected to copper or nickel plating to metallize the base, followed by magnetic plating, for example, electroplating or electroless plating of a Co alloy or Co-Ni alloy such as Co-P, Co-B, Co-Cu-P, Co-Cu-B, Co-Cr-P, Co-Cr-B, Co-Ni, Co-Ni-P, Co-Ni-B, Co-Ni-Cu-P, Co-Ni-Cu-B, Co-Ni-Cr-P, Co-Ni-Cr-B, etc. as described in Japanese Pat. No. 45524/1972 and U.S. Pat. Nos. 3,138,479, 3,234,031, 3,238,061, 3,338,726, 3,354,059, 3,378,400, 3,416,932, 3,416,955, 3,446,657, 3,463,708, 3,549,417, 3,578,571, 3,637,471, 3,672,968, 3,702,263, 3,745,039 and 3,751,345. Such a magnetic layer is generally plated in a thickness of 0.1 to 0.3 micron. The magnetic properties vary with the intended use but the coercive force for video is ordinarily 400 to 600 oersteds.

Thereafter, rhodium plating as a first protective layer is carried out by the process as described in U.S. Pat.

No. 3,471,272, in which, for example, plating is effected for 3 minutes at a plating temperature of 45 ± 5 °C and a current density of 2 A/dm² in a plating bath consisting of 20 g of rhodium sulfate, 5 ml of sulfuric acid and 1000 ml of water. Useful metals as the first protective plating layer of the invention are, in addition to rhodium, hard plating rare earth metals such as osmium, ruthenium and rhenium. The hard plating metal is a metal such as having a hardness of 400 or more when plated in a thickness of 20 microns and measured with keeping a load of 50 g for 10 seconds using a microvickers hardness meter. For example, chromium plating satisfies this condition. Such a hard metal is plated, preferably, in a thickness of 0.01 to 2 microns from a suitable plating bath, for example, any of rare earth plating baths or Sergeant bath for chromium plating. The plating conditions during the same time vary somewhat with the variety of plating baths, but the temperature of the plating bath is generally about 40° to 80 °C, preferably about 60 °C. The above described plating bath for the first protective plating layer, such as Re, Os, Ru, Cr or Rh plating bath disclosed in Japanese Patent Nos. 16604/1968 and 6981/1974, Japanese patent application (OPI) Ser. Nos. 90642/1974 and 72699/1974 (corresponding to U.S. patent application Ser. No. 416,545, Nov. 16, 1973), and U.S. Pat. Nos. 3,417,389, 3,471,272, 3,717,504, 3,729,396 and 3,763,002.

Then a noble metal such as silver, palladium, gold or platinum, copper or a Ni-P alloy, which is rich in lubricating property, as a second protective layer is coated onto the first protective plating layer in a thickness of 0.01 to 2 microns. If the thickness of the first or second protective plating layer is less than 0.01 micron, the film is not even and tends to produce a deposition unevenness and, therefore, a thickness of 0.01 micron or more is desirable. If too thick, however, the output of a reproduced signal becomes small and the recording density is not so increased, so a thickness of 2 microns or less is desirable. As the plating bath, commercially sold plating baths can sufficienly be used, for example, noble metal plating baths such as gold plating baths (Auro Base 24 —Trade Name of Nisshin Kasei Co., Ltd.), palladium plating baths and silver plating baths (Nisshin Bright —Trade Name of Nisshin Kasei Co., Ltd.). As the copper plating bath there can be used a copper pyrophosphate plating bath of Okuno Seiyaku Co., Ltd, and a Ni-P plating bath (Brenner Bath, disclosed in *Journal of Research National Bureau of Standard*, Vol. 37, page 31 (1946) and Vol. 39, page 385 (1947). These plating baths should be used according to their specified conditions respectively. The above described plating bath for the second protective plating layer, such as Ag, Au, Cu, Pt, Pd or Ni-P plating bath disclosed in Japanese Pat. Nos. 18244/1968 (corresponding to French Pat. No. 1,269,208), 26764/1971, 15802/1974 and 41881/1973 (corresponding to British Pat. No. 1,271,465), Japanese patent application (OPI) Ser. Nos. 44135/1973, 66810/1973, 80434/1973, 115938/1974, 118630/1974, 118631/1974 and 29445/1974 (corresponding to U.S. Pat. No. 3,719,525), U.S. Pat. Nos. 3,006,819, 3,284,324, 3,321,328, 3,417,389, 3,471,272, 3,485,725, 3,531,379, 3,607,149, 3,647,512, 3,700,481, 3,758,304, 3,799,794 and 3,853,589, and British Pat. Nos. 1,344,770 and 1,328,016 (corresponding to Canadian Pat. No. 924,194).

Suitable conditions for forming the first protective layer or second protective layer are generally as follows:

Plating Solutions

Plating solutions are generally prepared by dissolving in water acid salts, double salts, complex salts, double salts and metallic acid salts of metals capable of feeding the corresponding metal irons, such as sulfates, sulfites, chlorides, chlorites, nitrochlorides, phosphates, chromates, rhenates, chloroplatinates, cyanoaurates, cyanides.

Concentration of Metal Ion

About 0.01 to 5 mols/l
(preferably 0.1 to 3 mols/l)

Temperature

About 10° to 70 °C
(preferably 20° to 60 °C)

pH

About 0.1 to 13
(preferably 0.5 to 12)

Electric Current Density

About 0.1 to 10 A/dm²
(preferably 0.5 to 5 A/dm²)

These conditions should be chosen depending on the variety of metals to be plated.

The so obtained disk having the first and second protective plating layers has the following features:
1. The intimacy of the magnetic disk and magnetic head can be improved through the second protective plating layer. Consequently, both of the disk and head are not scratched and their life can largely be lengthened.
2. The magnetic disk is resistant to a rapid force by the effect to the first protective layer and thus not damaged.
3. A uniform film can be attained more readily as compared with an overcoat of silicone resin, etc.
4. The output of a high frequency range (4 to 5 MHz) can more be improved by the lubricating effect of the second protective plating layer as compared with in the case of the magnetic disk of the prior art.

The merits or advantages of the present invention will clearly be understood from these features.

The present invention will be further illustrated in greater detail by the following Examples. It will be self-evident to those skilled in the art that the ratios, ingredients in the following formulations and the order of operations can be modified within the scope of the present invention. Therefore, the present invention is not to be interpreted as being limited to the following Examples.

EXAMPLE 1

As a disk base plate, an aluminum plate of A.A Stardard (A.A 7075) was used which had an outer diameter of 140 mm, inner diameter of 45 mm and thickness of 4 mm and which surface was polished in a surface roughness of 0.2 S or less, and then subjected to substitution plating of zinc, commonly used in the ordinary plating of aluminum, in a thickness of 0.1 to 0.05 micron, to copper plating in a thickness of 3 to 5 microns and thereafter to the following magnetic plating in a thickness of 0.25 micron at 40 °C and 1.5 A/dm² and in a plating time of 62 seconds. A number of disks thus subjected to magnetic plating were prepared and were respectively subjected to platings of the first protective layer and second plating layer using the plating baths and plating conditions as shown in the following table.

Then each of the so obtained disks having the protective plating layers was subjected to a disk recorder to examine the change of the disk life. The life was defined as a time when a signal written at the start was lowered by 2 dB from the first during continuous reproduction thereof. The disk recorder was revolved at 3600 rpm and a ferrite head was contacted with the disk at a speed of 22 m/sec with a head load of 22 g. The recorded signal was 4.51 MHz. The results are shown in Tables 1—1 and 1–2.

Magnetic Plating Bath
| | |
|---|---|
| $CoSO_4.7H_2O$ | 200 g |
| $CoCl_2.6H_2O$ | 50 g |
| $NiSO_4.7H_2O$ | 200 g |
| $H_3BO_3$ | 50 g |
| $CuSO_4.5H_2O$ | 3 g |
| Water | 1000 ml |

Rh Plating Bath
| | |
|---|---|
| Metallic Rhodium (As Sulfate) | 2 g |
| Phosphoric Acid | 60 g |
| Water | 1000 ml |

Cr Plating Bath
| | |
|---|---|
| Anhydrous Chromic Acid | 200 g |
| Sulfuric Acid | 2 g |
| Water | 1000 ml |

Re Plating Bath
| | |
|---|---|
| Ammonium Perrhenate | 14 g |
| Ammonium Dihydrogen Phosphate | 160 g |
| Ammonia Water (60 %) | 100 ml |
| Water | 1000 ml |

Pt Plating Bath
| | |
|---|---|
| Ammonium Chloroplatinate | 16 g |
| Sodium Hydroxide | 24 g |
| Ammonium Chloride | 10 g |
| Citric Acid | 90 g |
| Water | 1000 ml |

Ni-P Plating Bath
Shumer Ni Plating Bath

Pd Plating Bath
| | |
|---|---|
| Palladous Chloride | 4.2 g |
| Sodium Hydrogen Phosphate | 120 g |
| Ammonium Hydrogen Phosphate | 24.3 g |
| Benzoic Acid | 2.6 g |
| Water | 1000 ml |

Ru Plating Bath
| | |
|---|---|
| Ruthenium Nitrochloride | 4.4 g |
| Sulfuric Acid | 24 ml |
| Water | 1000 ml |

Ag Plating Bath
| | |
|---|---|
| Silver Cyanide | 2.4 g |
| Potassium Cyanide | 70 g |
| Water | 1000 ml |

Au Plating Bath
| | |
|---|---|
| Potassium Cyanoaurate | 40 g |
| Potassium Cyanide | 80 g |
| Turkey Red Oil | 2 g |
| Water | 1000 ml |

Cu Plating Bath
| | |
|---|---|
| Copper Sulfate | 80 g |
| Boric Acid | 50 g |
| Water | 1000 ml |

Os Plating Bath
| | |
|---|---|
| $Na_2OsCl_5$ | 12 g |
| $H_2SO_4$ | 80 ml |
| Water | 1000 ml |

Table 1-1

| Sample No. | First Protective Layer | | | | Second Protective Layer | | | |
|---|---|---|---|---|---|---|---|---|
| | Metal | Plating Condition °C | A/dm² | Plating Thickness μ | Metal | Plating Condition °C | A/dm² | Plating Thickness μ |
| 1 | Rh | 40 | 1.5 | 0.25 | — | — | — | — |
| 2 | Rh | 40 | 1.5 | 0.20 | Au | 40 | 2.0 | 0.05 |
| 3 | Rh | 40 | 1.5 | 0.18 | Ag | 55 | 1.8 | 0.07 |
| 4 | Rh | 40 | 1.5 | 0.20 | Cu | 55 | 2.5 | 0.05 |
| 5 | Cr | 60 | 4 | 0.25 | — | — | — | — |
| 6 | Cr | 60 | 4 | 0.20 | Au | 40 | 2.0 | 0.05 |
| 7 | Cr | 60 | 4 | 0.16 | Ag | 55 | 1.8 | 0.09 |
| 8 | Cr | 60 | 4 | 0.20 | Pd | 40 | 1.2 | 0.05 |
| 9 | Rh | 40 | 1.0 | 0.15 | Pt | 40 | 2.0 | 0.10 |
| 10 | Os | 55 | 2.0 | 0.25 | — | — | — | — |
| 11 | Re | 40 | 2.0 | 0.25 | — | — | — | — |
| 12 | Os | 55 | 2.0 | 0.10 | Ni-P | 60 | — | 0.15 |
| 13 | Re | 40 | 2.0 | 0.10 | Cu | 55 | 2.0 | 0.15 |
| 14 | Ru | 40 | 1.8 | 0.25 | — | — | — | — |
| 15 | Ru | 40 | 1.8 | 0.15 | Au | 40 | 2.0 | 0.10 |

Table 1-2

| Sample No. | Head Surface Roughening | Electromagnetic Conversion Characteristics | |
|---|---|---|---|
| | | Life | S/N of 4.5 MHz |
| 1 | C | 81$^{hr}$ | 0$^{dB}$ |
| 2 | A | 460 | + 1.8 |
| 3 | A | 420 | + 0.8 |
| 4 | B | 243 | + 0.5 |
| 5 | B–C | 41 | – 0.8 |
| 6 | A | 340 | + 1.2 |
| 7 | B | 280 | + 1.0 |
| 8 | A | 320 | + 0.8 |
| 9 | B | 380 | + 1.6 |
| 10 | B | 100 | – 0.3 |
| 11 | A–B | 41 | – 0.4 |
| 12 | A | 310 | + 0.6 |
| 13 | B | 330 | + 1.0 |
| 14 | C | 21 | 0.0 |
| 15 | A | 410 | + 1.4 |

Note:
A = No Occurrence
B = Little Occurrence
C = Much Occurrence

The following facts are apparent from the results of Tables 1—1 and 1–2:

1. The life of a disk is largely lengthened by the provision of the second protective plating layer with a smaller thickness than the first protective plating layer.

2. By the provision of the second protective plating layer, the surface is made smooth and the head touch is improved, thus raising the ratio of S/N. This is a surprising and unexpected result.

3. By the provision of the second protective plating layer, the head abrasion and head surface roughening are decreased.

4. The second protective plating layer has the desired results in any combination with a first protective layer if the first protective plating layer is sufficiently hard and the second protective plating layer is rich in lubricating property. As apparent from these results, the present invention is very advantageous.

EXAMPLE 2

The procedure of Example 1 was repeated except using the following electroless plating bath as a magnetic plating bath and effecting the plating at 80 °C for 180 seconds to thus obtain a thickness of 0.24 micron.

| Plating Bath | |
|---|---|
| Cobalt Sulfate | 220 g |
| Cobalt Chloride | 40 g |
| Sodium Citrate | 1 g |
| Sodium Hypophosphite | 60 g |
| Water | 1000 ml |

The life test was carried out in an analogous manner to Example 1 to obtain results as shown in Tables 2-1 and 2-2. The following facts will be apparent from the results of Tables 2-1 and 2—2.

1. There are obtained the similar effects both in Examples 1 and 2 in spite of changing the magnetic plating bath.
2. According to the present invention, the lifes of any magnetic recording media can effectively by lengthened.

Table 2-1

| Sample No. | First Protective Layer | | | Second Protective Layer | | | |
|---|---|---|---|---|---|---|---|
| | | Plating Condition | | Plating Thickness μ | | Plating Condition | | Plating Thickness μ |
| | Metal | °C | A/dm² | μ | Metal | °C | A/dm² | μ |
| 1 | Rh | 40 | 1.5 | 0.25 | — | — | — | — |
| 2 | Rh | 40 | 1.5 | 0.20 | Au | 40 | 2.0 | 0.05 |
| 3 | Rh | 40 | 1.5 | 0.18 | Ag | 55 | 1.8 | 0.07 |
| 4 | Rh | 40 | 1.5 | 0.20 | Cu | 55 | 2.5 | 0.05 |
| 5 | Cr | 60 | 4 | 0.25 | — | — | — | — |
| 6 | Cr | 60 | 4 | 0.20 | Au | 40 | 2.0 | 0.05 |
| 7 | Cr | 60 | 4 | 0.16 | Ag | 55 | 1.8 | 0.09 |
| 8 | Cr | 60 | 4 | 0.20 | Pd | 40 | 1.2 | 0.05 |
| 9 | Rh | 40 | 1.0 | 0.15 | Pt | 40 | 2.0 | 0.10 |
| 10 | Os | 55 | 2.0 | 0.25 | — | — | — | — |
| 11 | Re | 40 | 2.0 | 0.25 | — | — | — | — |
| 12 | Os | 55 | 2.0 | 0.10 | Ni-P | 60 | — | 0.15 |
| 13 | Re | 40 | 2.0 | 0.10 | Cu | 55 | 2.0 | 0.15 |
| 14 | Ru | 40 | 1.8 | 0.25 | — | — | — | — |
| 15 | Ru | 40 | 1.8 | 0.15 | Au | 40 | 2.0 | 0.10 |

Table 2-2

| Sample No. | Head Surface Roughening | Electromagnetic Conversion Characteristics | |
|---|---|---|---|
| | | Life | S/N of 4.5 MHz |
| 1 | C | 75$^{hr}$ | 0$^{dB}$ |
| 2 | A–B | 420 | +1.1 |
| 3 | A | 443 | +0.6 |
| 4 | B | 310 | +0.6 |
| 5 | C | 52 | −0.8 |
| 6 | A | 310 | +1.2 |
| 7 | A | 243 | +0.4 |
| 8 | B | 180 | +0.3 |
| 9 | A | 240 | +1.4 |
| 10 | B | 120 | 0 |
| 11 | B | 43 | −0.2 |
| 12 | A | 246 | +0.4 |
| 13 | A–B | 410 | +0.6 |
| 14 | C | 63 | −0.4 |
| 15 | A | 425 | +0.4 |

Note:
A = No Occurrence
B = Little Occurrence
C = Much Occurrence

It will be understood from the results of Examples 1 and 2 that the protective plating layers of the invention are very effective for protection of magnetic recording media.

Furthermore, it is found by our experiments that even when a copper plate is used as a base plate or when the electroless reduction plating or substitution plating method is used for the second protective plating layer, the similar effects to those of Examples 1 and 2 can be given.

COMPARATIVE EXAMPLE

When the surface of Rh plating of Sample No. 1 shown in Table 1—1 was coated with silicone resin as a lubricating film in a small amount, the head surface roughening was B, the life was 95 hr and the ratio of S/N of 4.5 MHz was -0.4 dB.

It is apparent from this result that the provision of the second protective plating layer according to the present invention is superior to the coating of a lubricating film according to the prior art.

What we claim is:

1. A magnetic recording medium, which comprises a first protective plating layer consisting of at least one selected from the group consisting of rhenium, osmium, ruthenium, chromium, rhodium and mixtures thereof, provided on a ferromagnetic thin layer plated on a non-magnetic base material by a plating method, and a second protective plating layer consisting of at least one selected from the group consisting of silver, gold, copper, platinum, palladium, nickel-phosphorus alloys and mixtures thereof, further provided on the first protective plating layer.

2. The magnetic recording medium of claim 1, wherein the first protective plating layer has a thickness of 0.01 to 2 microns.

3. The magnetic recording medium of claim 1, wherein the second protective plating layer has a thickness of 0.01 to 2 microns.

4. The magnetic recording medium of claim 1, wherein the first and second protective plating layers are provided by electroplating or electroless plating.

5. The magnetic recording medium of claim 1, wherein the non-magnetic material is selected from aluminum alloys, magnesium alloys, glass, ceramics and plastics.

6. The magnetic recording medium of claim 1, wherein the ferromagnetic thin layer is at least one selected from the group consisting of Co alloys and Co-Ni alloys.

7. The magnetic recording medium of claim 6, wherein the Co alloys are selected from the group consisting of Co-P, Co-B, Co-Cu-P, Co-Cu-B, Co-Cr-P and Co-Cr-B.

8. The magnetic recording medium of claim 6, wherein the Co-Ni alloys are selected from the group consisting of Ci-Ni, Co-Ni-P, Co-Ni-B, Co-Ni-Cu-P, Co-Ni-Cu-B, Co-Ni-Cr-P and Co-Ni-Cr-B.

* * * * *